United States Patent [19]

Emhardt et al.

[11] 4,186,932
[45] Feb. 5, 1980

[54] RESILIENT SEALING RING

[75] Inventors: Roland Emhardt, Henggart; Erich Wachter, Zurich, both of Switzerland

[73] Assignee: Sulzer Brothers Limited, Winterthur, Switzerland

[21] Appl. No.: 923,299

[22] Filed: Jul. 10, 1978

[30] Foreign Application Priority Data

Jul. 14, 1977 [CH] Switzerland ............ 8714/77

[51] Int. Cl.² .................................... F16J 15/32
[52] U.S. Cl. .................... 277/207 A; 277/186; 277/205; 285/110; 285/345
[58] Field of Search ........... 277/207 R, 207 A, 205, 277/208–210, 169, 166, 186, 168; 285/110–113, 231, 345

[56] References Cited

U.S. PATENT DOCUMENTS

| 2,451,354 | 10/1948 | Ohls | 285/112 X |
| 2,501,943 | 3/1950 | Jack | 277/207 A |
| 3,127,196 | 3/1964 | Fabian et al. | 285/113 X |
| 3,325,174 | 6/1967 | Weaver | 277/168 |
| 3,510,140 | 5/1970 | Hermann | 277/205 |
| 3,567,233 | 3/1971 | Stepanich | 277/207 A X |
| 3,649,053 | 3/1972 | Synder | 285/110 |

FOREIGN PATENT DOCUMENTS

| 1908130 | 9/1970 | Fed. Rep. of Germany | 277/207 A |
| 2518001 | 10/1975 | Fed. Rep. of Germany | 277/205 |
| 2517221 | 10/1976 | Fed. Rep. of Germany | 285/110 |
| 92415 | 10/1959 | Netherlands | 277/168 |
| 911389 | 11/1962 | United Kingdom | 285/111 |
| 1270526 | 4/1972 | United Kingdom | 285/110 |

Primary Examiner—Robert S. Ward, Jr.
Attorney, Agent, or Firm—Kenyon & Kenyon

[57] ABSTRACT

The sealing ring is initially made with two arms which are oriented to define a fold. When in place between two overlapping pipes, the inwardly directed arm is rolled outwardly into coaxial relation with the unfolded arm in order to provide a tight seal between the two pipes. The seal ring may be initially formed with a U-shaped cross-section or with a cross-section in which one arm is disposed transverse to the other arm.

12 Claims, 4 Drawing Figures

U.S. Patent   Feb. 5, 1980   4,186,932
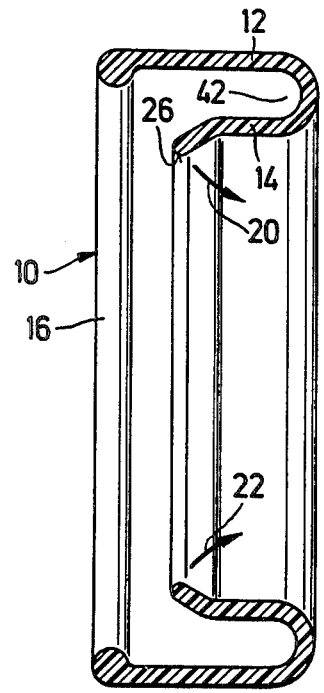
Fig.1
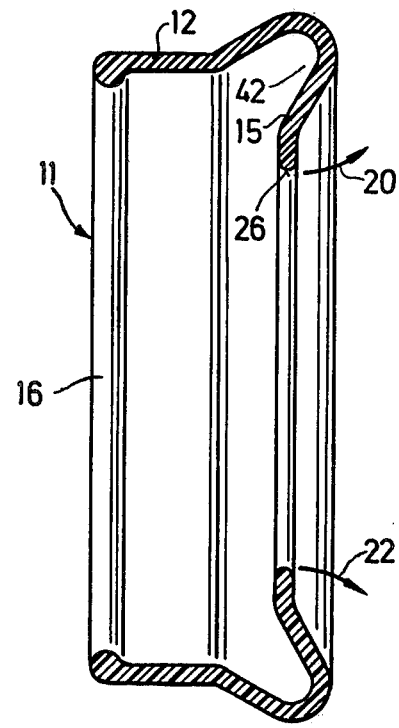
Fig.2
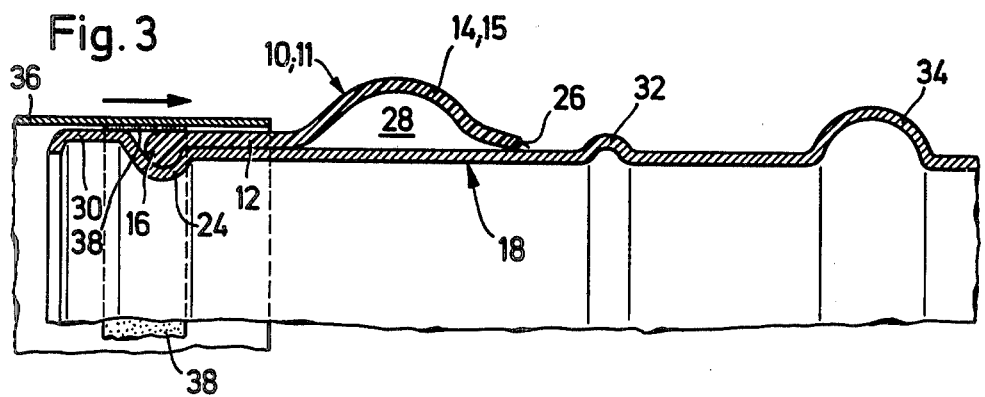
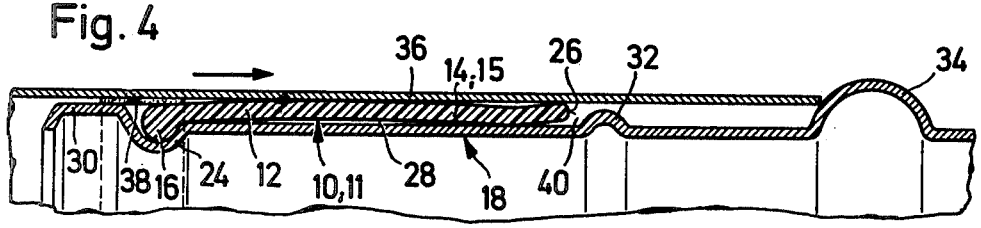

RESILIENT SEALING RING

This invention relates to a resilient sealing ring and, particularly, to a resilient sealing ring for two overlapping pipes.

Heretofore, it has been known to use solid resilient sealing rings of circular cross-section to seal an annular gap between two overlapping tubes which are movable relative to one another, for instance, where a ventilating tube or pipe is pushed onto another like tube or pipe. However, these sealing rings present considerable resistance when a tube is pushed on or pulled off another tube. In order to obviate this problem, use has been made of sealing rings which have a cross-sectional shape employing two arms, one for securing and one to provide seal tightness. Usually, the securing arm extends parallel to the tube axis and is secured to the tube while the sealing arm projects substantially perpendicular from the tube in the unloaded state and, in the loaded state, is bent onto the inner tube when the outer tube is pushed on to the latter. However, a disadvantage of such seals is that they have to be made of a relatively dimensionally stable elastomer section. As a result, if the tubes are not very even, peripheral waviness and impairment of sealing tightness may occur.

Accordingly, it is an object of the invention to provide a resilient sealing ring of non-circular cross-section and of relatively soft elastomer for sealing a gap between two movable tubes.

It is another object of the invention to provide a resilient sealing ring of relatively reduced wall thickness which is capable of bearing on the walls of two overlapping tubes in the manner of a cushion.

It is another object of the invention to provide an effective seal between two overlapping tubes despite considerable unevenness or non-circularity of the pipes.

Briefly, the invention provides a resilient sealing ring having a predetermined cross-sectional shape including a pair of arms disposed in folded relation to each other to define a fold therebetween with at least one arm disposed axially of the ring. In addition, the ring has a bead at one end of the axially disposed arm for anchoring the sealing ring in place between two overlapping tubes.

When put in place, the sealing ring is in an unfolded or straightened shape such that the two arms are spread out axially of the tubes to bear resiliently on the walls of the tubes.

In one embodiment, the ring cross-section is U-shaped such that the two arms are substantially parallel and coaxial. In another embodiment, one of the arms is disposed axially of the ring while the other arm is disposed transversely and radially inwardly of the ring. In both embodiments, the ring is usually mounted via the bead in a groove of an inner tube with the arms folded outwardly along the length of the inner tube. Thereafter, an outer tube can be slid over the inner tube and sealing ring. Alternatively, the ring can be mounted in the outer tube and the inner tube can be pushed into the outer tube and ring such that the inwardly folded arm of the ring is rolled out into a straightened condition on the inner tube.

These and other objects and advantages of the invention will become more apparent from the following detailed description taken in conjunction with the accompanying drawings wherein:

FIG. 1 illustrates longitudinal sectional view through a resilient sealing ring according to the invention;

FIG. 2 illustrates a longitudinal sectional view through another embodiment of a sealing ring according to the invention;

FIG. 3 illustrates a longitudinal sectional view through a resilient sealing ring according to the invention being secured to an inner tube but before being deformed by an outer tube to be fitted on the inner tube; and FIG. 4 illustrates a longitudinal sectional view through a resilient sealing ring according to the invention with the ring in a deformed state in an annular gap between the inner tube and the outer tubes.

Referring to FIG. 1, the resilient sealing ring 10 is initially formed with a U-shaped cross-section with two arms 12, 14 disposed in folded relation to each other to define a fold 42. As shown, both arms 12, 14 are coaxial of the ring 10 and are in substantially parallel relation to each other. The outer arm 12 also has a radially inwardly directed bead 16 of generally circular cross-section at one end while the inner arm 14 has an inwardly directed lip 26.

Referring to FIG. 2, wherein like reference characters indicate like parts as above, the sealing ring 11 may alternatively have a cross-section wherein the inner arm 15 is disposed transversely of the outer arm 12 and is directed radially inwardly of the ring 11.

Referring to FIG. 3, when using the sealing ring 10 (11) to seal an annular gap between two overlapping or telescoped tubes 18, 36, the ring 10 (11) is disposed in a folded out or straightened position between the tubes 18, 36 while effecting a seal tight fit with each tube 18, 36. To this end, the sealing ring 10 (11) is secured to the inner tube 18 with the inner arm 14 (15) first being bent round in the direction indicated by the arrows 20, 22 (FIGS. 1 and 2) and then pushed onto the tube 18. In addition, the inner tube 18 has an annular peripheral retaining groove 24 in which the bead 16 of the ring 10 (11) fits in secured relation. The outer arm 12 thus engages intimately with the inner tube 18 while the deformed inner arm 14 (15) engages the outer wall or surface of the tube 18 only at the lip 26 at the end; the intermediate curved part remaining spaced from the tube 18 to define a curved bellows-like element bounding an enclosed annular chamber 28.

As shown, the inner tube 18 has a raised edge 30 at one end with an outer diameter co-planar with the outer surface of the arm 12 of the sealing ring 10 (11). The tube 18 also has an annular centering groove 32 which forms a raised portion on the outer periphery and a further annular groove 34 which forms a raised end stop on the outer periphery for the outer tube 36 (FIG. 4). The centering groove 32 can be devised as an end stop for the free end 26 of the arm 14 (15), in which event the chamber 28 is substantially enclosed and seal tightness improved.

As shown in FIG. 3, an adhesive strip 38 can be used for additional securing of the sealing ring 10 (11) to the tube 18. The bead 16 can be secured in the groove 24, for example, by means of adhesive.

As can be gathered from FIG. 4, after the tube 36 has been moved axially over the inner tube 18 as far as the end stop 34, the curved arm 14 (15) of the sealing ring 10 (11) is in a state of resilient deformation and in this state enters into intimate and resilient sealing engagement, after the fashion of a cushion, with the walls which bound an annular gap between the inner and outer tubes 18, 36. As indicated, the previously facing sides of the arms 12, 14 are now disposed in resilient contact with the inner tube 18.

The invention thus provides a sealing ring which is particularly useful for jointing together spiral metal tubes or pipes for ventilation purposes, but is also of course useful, e.g., with plastics tubing or piping.

As a convenient way of producing the resilient sealing ring, an elastomer section in strip or band form can in known manner be extruded, whereafter the strip or band ends are stuck and/or welded together. The sealing ring can also be produced by pressing or diecasting.

In the embodiments herein disclosed, the sealing ring has been shown as fitted to the inner tube outer wall. The sealing ring shown in FIGS. 1 and 2, however, can, of course, be mounted on the outer tube inner wall. In this case, the edge bead 16 would be directed outwardly and the sealing ring could be unfolded or straightened out from the folded shape directly by the edge of the entering inner tube, that is, the inner tube would first be introduced into the fold 42 and, upon continued movement, would unfold or straighten out the sealing ring from the initial folded shape.

It is noted that the sealing ring 10 of FIG. 1 has a stronger spring effect than the ring 11 of FIG. 2 when unfolded or straightened out and secured to a tube. However, the ring 11 of FIG. 2, although having a weaker spring effect, is easier to unfold or straighten out and secure to the tube 18 than is the ring 10 of FIG. 1.

What is claimed is:

1. A resilient sealing ring for sealing an annular gap between two overlapping tubes disposed in coaxial moveable relation, said ring having a predetermined cross sectional shape including a pair of arms disposed in folded relation to each other to define a fold therebetween with at least one of said arms being disposed axially of said ring and a second of said arms being foldable into coaxial relation to said one arm to dispose facing sides of said arms in resilient contact with one of the tubes.

2. A resilient sealing ring as set forth in claim 1 wherein said shape is a U-shape.

3. A resilient sealing ring as set forth in claim 1 wherein each arm is disposed axially of said ring.

4. A resilient sealing ring as set forth in claim 1 which is made of extruded strip form with a pair of ends disposed in abutted and secured relation to each other.

5. In combination an inner tube, an outer tube disposed in overlapping movable coaxial relation with said inner tube to define an annular gap therewith, and a resilient sealing ring disposed between said tubes in sealing relation therewith to seal said gap, said sealing ring including an annular bead at one end secured to one of said tubes, a first annular arm extending from said bead and a second annular arm unfolded from said first arm and extending coaxially along said tubes in sealing contact with at least the other of said tubes.

6. The combination as set forth in claim 5 wherein said inner tube has an annular retaining groove in an outer surface thereof and said bead is secured in said groove.

7. The combination as set forth in claim 5 wherein said one tube has an annular centering groove.

8. The combination as set forth in claim 7 wherein said arm extends to and abuts said centering groove.

9. The combination as set forth in claim 5 wherein said one tube has an annular groove defining an end stop for said other tube.

10. In combination an inner tube having a raised edge at one end with a predetermined outer diameter, an annular retaining groove adjacent said raised edge and an annular center bead on an outer surface spaced from said retaining groove;

an outer tube disposed in overlapping coaxial relation with said inner tube; and a resilient sealing ring disposed between said tubes, said ring having an annular bead secured in said retaining groove, a first annular arm extending from said bead coaxially of said tubes and having an outer surface co-planar with said raised edge, and a second annular unfolded arm extending from said first arm to said center bead and disposed in resilient sealing engagement with said tubes.

11. The combination as set forth in claim 10 wherein said arms and said inner tube define an enclosed annular chamber.

12. The combination as set forth in claim 10 wherein said inner tube further includes a second annular bead of greater diameter than said outer tube to define an end stop for said outer tube and wherein said outer tube abuts said second annular bead.

* * * * *

UNITED STATES PATENT AND TRADEMARK OFFICE
CERTIFICATE OF CORRECTION

PATENT NO. : 4186932
DATED : February 5, 1980
INVENTOR(S) : Roland Emhardt, et al.

It is certified that error appears in the above-identified patent and that said Letters Patent are hereby corrected as shown below:

Column 2, Line 68 - After "gap" insert --40--

Signed and Sealed this

Seventeenth Day of June 1980

[SEAL]

Attest:

SIDNEY A. DIAMOND

Attesting Officer

Commissioner of Patents and Trademarks